(12) United States Patent  
Masuda

(10) Patent No.: US 11,930,149 B2  
(45) Date of Patent: Mar. 12, 2024

(54) INFORMATION PROCESSING APPARATUS AND INFORMATION PROCESSING METHOD

(71) Applicant: SHARP KABUSHIKI KAISHA, Sakai (JP)

(72) Inventor: Akitoshi Masuda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/888,349

(22) Filed: Aug. 15, 2022

(65) Prior Publication Data

US 2023/0058674 A1 Feb. 23, 2023

(30) Foreign Application Priority Data

Aug. 20, 2021 (JP) ................................ 2021-134462

(51) Int. Cl.
*H04N 1/32* (2006.01)
*H04N 1/00* (2006.01)

(52) U.S. Cl.
CPC ..... *H04N 1/32641* (2013.01); *H04N 1/32662* (2013.01)

(58) Field of Classification Search
None
See application file for complete search history.

(56) References Cited

U.S. PATENT DOCUMENTS

| | | | | |
|---|---|---|---|---|
| 2009/0122339 | A1* | 5/2009 | Nakamura | G06Q 10/10 358/1.15 |
| 2017/0310803 | A1* | 10/2017 | Park | B60R 16/023 |
| 2020/0073853 | A1* | 3/2020 | Tsuchihashi | H04N 1/2112 |
| 2020/0076968 | A1* | 3/2020 | Nakamura | G06F 3/1236 |
| 2021/0297513 | A1* | 9/2021 | Fukushima | H04M 1/006 |
| 2022/0286554 | A1* | 9/2022 | Jiang | H04W 68/005 |

FOREIGN PATENT DOCUMENTS

| | | | | |
|---|---|---|---|---|
| CN | 108616638 | * | 10/2018 | ............ H04M 1/60 |
| EP | 3097706 | * | 11/2016 | ............ H04W 4/16 |
| JP | 2003131989 | * | 5/2003 | ............ G06F 13/00 |
| JP | 2009060202 | * | 3/2009 | ............ H04N 1/00 |
| JP | 2010103916 | * | 5/2010 | ............ H04N 1/00 |
| JP | 2011077677 | * | 4/2011 | ............ H04M 1/00 |
| JP | 2012222595 | * | 11/2012 | ............ H04M 11/00 |
| JP | 2019-213087 A | | 12/2019 | |
| KR | 20050003901 | * | 1/2005 | ............ H04Q 7/24 |
| KR | 20150043587 | * | 4/2015 | ............ H04W 12/06 |

* cited by examiner

*Primary Examiner* — Beniyam Menberu

(74) *Attorney, Agent, or Firm* — ScienBiziP, P.C.

(57) ABSTRACT

An information processing apparatus includes: a communicator to communicate with a terminal device; and a controller to control the communicator, wherein the controller transmits an acquisition request for address book information to the terminal device via the communicator, and the controller performs control to retransmit the acquisition request when the address book information cannot be obtained in response to the acquisition request and a given time period does not elapse since transmission of the acquisition request is initiated.

7 Claims, 15 Drawing Sheets

INFORMATION PROCESSING APPARATUS AND INFORMATION PROCESSING METHOD

BACKGROUND OF THE INVENTION

Field of the Invention

The present disclosure relates to information processing apparatus and information processing methods, etc.

Description of the Background Art

Conventionally, methods of linking devices such as multifunction peripherals (MFPs) and mobile terminals such as smartphones have been known. For example, the conventional technology discloses an image processing device which obtains destination information based on information received from the mobile terminal and sends data from image processing results to an address corresponding to the destination information.

Conventional technology, for example, connects the image processing device and the mobile terminal via a wireless LAN (Local Area Network), and uses this connection to transmit and receive transmission settings including destination information. One method for transmitting and receiving information to establish a wireless LAN connection is to use Bluetooth®, for example. However, the conventional technology does not disclose details of communication control to appropriately transmit and receive the destination information.

The purpose of the present disclosure is to provide an information processing apparatus and an information processing method, etc. capable of appropriately sharing address book information stored in a terminal device.

SUMMARY OF THE INVENTION

One aspect of the present disclosure relates to an information processing apparatus including a communicator to communicate with a terminal device, and a controller to control the communicator, wherein the controller transmits an acquisition request for address book information to the terminal device via the communicator, and the controller performs control to retransmit the acquisition request when the address book information cannot be obtained in response to the acquisition request and a given time period does not elapse since transmission of the acquisition request is initiated.

Another aspect of the present disclosure relates to an information processing method in an information processing apparatus for obtaining address book information from a terminal device, the method including transmitting an acquisition request for the address book information to the terminal device, and retransmitting the acquisition request when the address book information cannot be obtained in response to the acquisition request and a given time period does not elapse since transmission of the acquisition request is initiated.

According to the present disclosure, it is possible to provide information processing apparatus and information processing methods, etc. capable of appropriately sharing address book information stored in a terminal device.

DESCRIPTION OF THE PREFERRED EMBODIMENTS

Now, an embodiment according to the present disclosure is described below with reference to the drawings. For the drawings, the same or equivalent components are denoted by an identical numerical number, and duplicated explanations are omitted. The present embodiment described below does not unduly limit a scope recited in the claims. In addition, it should be noted that the entire components described in the present embodiment are not necessarily essential requirements of the present disclosure.

1. System Configuration

Figure 1:
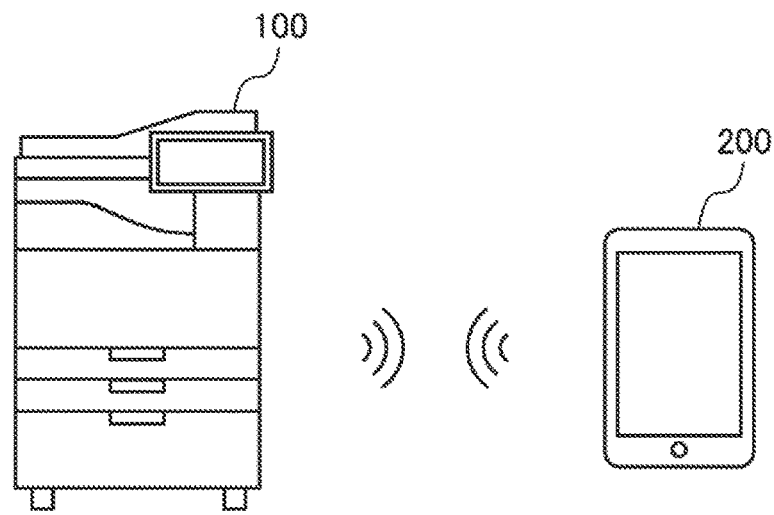
FIG. 1 is an example of a system including an information processing apparatus and a terminal Device.

FIG. 1 is a diagram illustrating a configuration of a system to which a method of the present embodiment is applied. As shown in FIG. 1, the system according to the present embodiment includes an information processing apparatus 100 and a terminal device 200.

The information processing apparatus 100 includes at least one of printing function and scanning function, for example. The information processing apparatus 100 may be a printer with a printing function, a scanner with a scanning function, or an MFP (Multifunction Peripheral) with both functions. Namely, the information processing apparatus 100 according to the present embodiment may be an image-forming apparatus or an image processing device. Furthermore, the information processing apparatus 100 may include other functions such as a facsimile function and copying function.

The terminal device 200 is a portable terminal device (mobile device) which can be carried by the user, for example. For example, the terminal device 200 may be a smartphone or a tablet terminal. Furthermore, the terminal device 200 may be a wearable device such as a wristwatch typed device or an eyeglass typed device. Moreover, the terminal device 200 according to the present embodiment may be a PC (Personal Computer), and various modifications can be carried out in a specific form.

Figure 2:
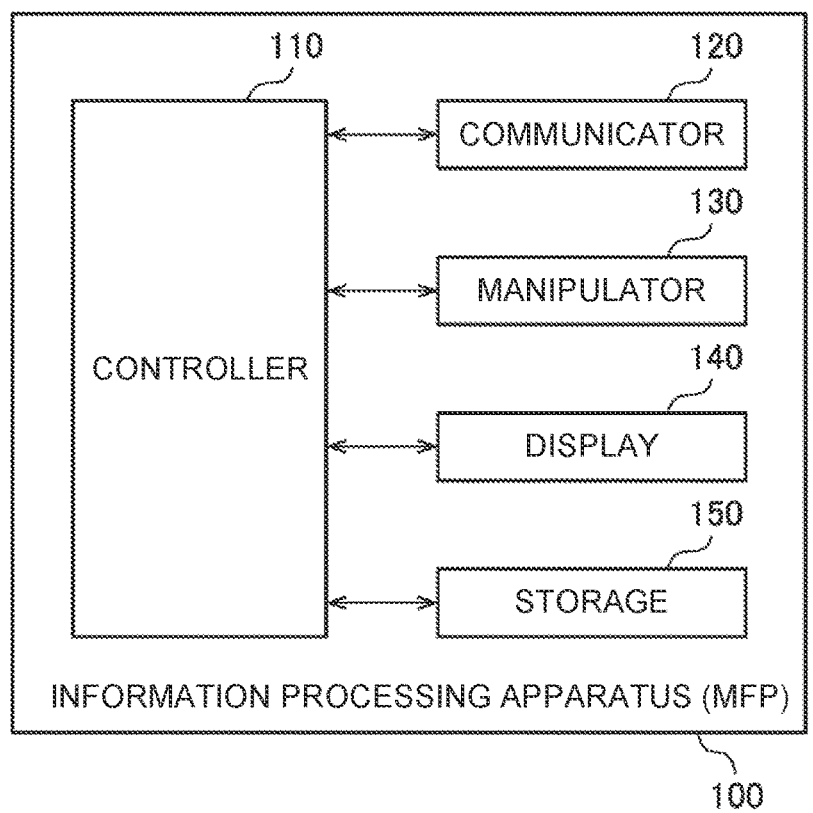
FIG. 2 is an exemplary configuration of the information processing apparatus.

FIG. 2 is a diagram illustrating an exemplary configuration of the information processing apparatus 100. The information processing apparatus 100 includes controller 110, communicator 120, manipulator 130, display 140, and storage 150. It should be noted that a configuration of the information processing apparatus 100 is not limited to that illustrated in FIG. 2, but may be carried out in a modified way by adding other components or omitting some components. Modifications such as omission and addition of the configurations can be also carried out similar to other configurations shown in other drawings such as FIG. 3, etc.

The controller 110 controls each of parts of the information processing apparatus 100. For example, the controller 110 performs communication control of the communicator 120 and display control of the display 140. The controller 110 in the present embodiment is composed of the following hardware. The hardware can include at least one a circuit to process digital signals and a circuit to process analog signals. For example, the hardware may be composed of one or more circuit devices or circuit elements implemented on circuitry substrate. The one or more circuit devices include an IC (Integrated Circuit, FPGA (field-programmable gate array), and the like, for example. The one or more circuit elements include a resistor, a capacitor, and the like, for example.

Furthermore, the controller 110 may be realized by the following processor. The information processing apparatus 100 in the present embodiment includes memory to store information and processor to work based on the information stored in the memory. The Information includes programs and various types of data, for example. The processor includes hardware. The processor can use various types of processor such as CPU (Central Processing Unit), GPU (Graphics Processing Unit), DSP (Digital Signal Processor), etc. The memory may be a semiconductor memory such as SRAM (Static Random Access Memory), DRAM (Dynamic Random Access Memory), flash memory, a resister, a magnetic storage device such as HDD (Hard Disk Drive), or an optical storage device such as optical disk device. For example, the memory stores computer readable instructions, and the processor executes the instructions to realize the functions of the controller 110 as a process. Here, the instructions may be a set of instructions configuring the program, or instructions to instruct the hardware circuitry of the processor to work.

The communicator 120 is an interface for communication with other devices and includes antenna, RF (radio frequency) circuitry, and base band circuit, for example. The communicator 120 works according to control by the controller 110. In addition, the communicator 120 may include a processor for communication control independent of the controller 110.

The communicator 120 may be a communication interface for a short-range wireless communication. Here, the short-range wireless communication includes Bluetooth® and standard evolving the same, for example. The communicator 120 may perform communication according to a specific profile of Bluetooth®. For example, the communicator 120 may acquire address book information from the terminal device 200 by performing communication according to Phone Book Access Profile (PBAP). The address book information is described in detail below. The short-range wireless communication in the present embodiment is not limited to Bluetooth®, but may be any other method such as ZigBee® and the like.

Furthermore, the communicator 120 can perform communication in accordance with other methods. For example, the communicator 120 can perform communication in accordance with the method specified in IEEE 802.11. Specifically, the communicator 120 may perform communication via WiFi®. For example, the communicator 120 can perform communication combining multiple communication methods to acquire address book information from the terminal device 200 using Bluetooth® and to send image data to a given address included in the address book information using WiFi®.

The manipulator 130, in which the user performs various operations of the information processing apparatus 100, can be realized by means of various buttons, GUI (Graphical User Interface), etc. The manipulator 130 may be realized by means of a touch panel.

The display 140 displays various display screens and can be realized by various-typed displays such as liquid crystal display, organic EL display and the like, for example. The display 140 displays screens described below using FIGS. 5 to 10, etc., for example.

The storage 150 is a work area of the controller 110 and stores various-typed information. The storage 150 can be realized by means of various-typed memories, which may be semiconductor memory, register, magnetic memory, or optical memory.

Figure 3:
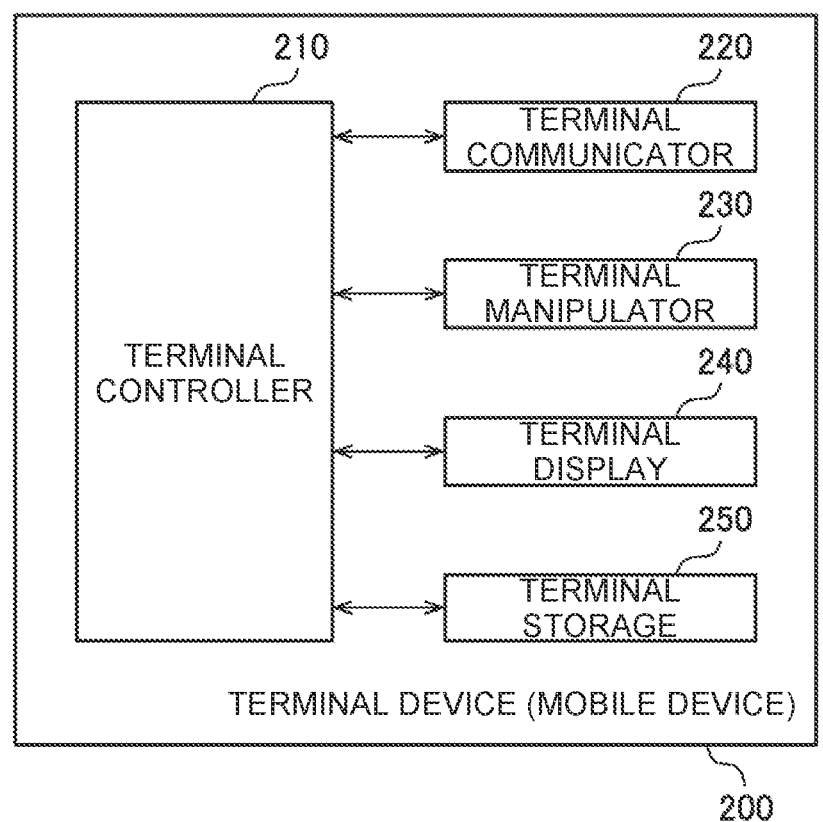
FIG. 3 is an exemplary configuration of the terminal device.

FIG. 3 is a block diagram showing a configuration of the terminal device 200. The terminal device 200 includes terminal controller 210, terminal communicator 220, terminal manipulator 230, terminal display 240, and terminal storage 250.

The terminal controller 210 controls each of parts of the terminal device 200. The terminal controller 210 in the present embodiment includes hardware having at least one of a circuit to process digital signals and a circuit to process analog signals. For example, the hardware may be composed of one or more circuit devices or circuit elements implemented on circuitry substrate.

Furthermore, the terminal controller 210 can be realized by means of various-typed processors such as CPU, GPU, DSP, etc. The terminal device 200 includes memory to store information and processor to work based on the information stored in the memory as mentioned above. The memory stores computer readable instructions, and the processor executes the instructions to realize the functions of the terminal controller 210 as a process.

The terminal communicator 220 is an interface for communication with other devices and includes antenna, RF circuitry, and base band circuit, for example. The terminal communicator 220 works according to control by the terminal controller 210. In addition, the terminal communicator 220 may include a processor for communication control independent of the terminal controller 210.

The terminal communicator 220 is a communication interface to perform communication according to Bluetooth®. Furthermore, the terminal communicator 220 may perform communication according to other methods such as mobile communication (5G, LTE, etc.) or WiFi®.

The terminal manipulator 230, in which the user performs various operations of the terminal device 200, can be realized by means of various buttons, GUI (Graphical User Interface), etc. The terminal manipulator 230 may be realized by means of a touch panel.

The terminal display 240 displays various display screens and can be realized by various-typed displays such as liquid crystal display, organic EL display and the like, for example. The terminal display 240 displays screens described below using FIGS. 12A to 12E, and FIGS. 14A to 14E, etc., for example.

The terminal storage 250 is a work area of the terminal controller 210 and stores various-typed information. The terminal storage 250 can be realized by means of various-typed memories, which may be semiconductor memory, register, magnetic memory, or optical memory.

For example, terminal storage 250 stores address book information. Here, address book information is information representing one or more addresses. The address is information to identify connection destination in communication, such as an E-mail address, for example. The address book information may be information correlating other information such as name, address, affiliation, etc. with each address. Also, the address is not limited to the E-mail address, but may be any other information to successfully identify the connection destination.

In addition, the terminal storage 250 stores OS (Operating System). The terminal controller 210 controls each of parts of the terminal device 200 by operating in accordance with the OS, middleware and application software running on the OS, etc. Here, the OS may be Android®, iOS®, or any other OS.

2. Process Flow

For example, it is assumed that a first user, who is a user of the terminal device 200, scans a document with the information processing apparatus 100 and transmits the scanned results to a second user. In this case, if the second user's address is stored in the first user's terminal device 200, it is possible to reduce time and trouble for inputting the address book information of the terminal device 200 by sharing the address book information of the terminal device with the information processing apparatus 100. Furthermore, not limited to the above mentioned example, it is useful to share address book information stored in the terminal device 200 with the information processing apparatus 100.

In this case, the controller 110 of the information processing apparatus 100 according to the present embodiment transmits an acquisition request of address book information to the terminal device 200 via the communicator 120, and when the address book information cannot be acquired in response to the acquisition request and a given time period does not elapse since transmission of the acquisition request is initiated, the controller 110 performs control to retransmit the acquisition request.

In order that the information processing apparatus 100 acquires the address book information, the user needs to permit the terminal device 200 to share the address book information with the information processing apparatus 100. Since the method according to the present embodiment allows the acquisition request to be retransmitted until a given amount of time elapses, this makes it possible to increase probability in which the user performs a permission operation at terminal device 200.

According to OS of the terminal device 200, behavior in transmitting and receiving the address book information may possibly differ. For example, while some OS does not allow the information processing apparatus 100 to proceed to the step of transmitting the acquisition request without the above mentioned permission (hereinafter referred to as "first OS"), some OS does the same without the permission (hereinafter referred to as "second OS"). For example, the first and second OSs are Android® and iOS®, respectively, but specific OSs are not limited thereto. In the case where OS of the terminal device 200 is the second OS, the information processing apparatus 100 can transmit the acquisition request regardless of whether the user permission is provided or not, thereby making it difficult to determine whether the user permission has been provided or not.

For example, in the case where the terminal device 200 working according to the second OS receives the acquisition request when the user provides no permission, it replies that the number of addresses it holds is zero, regardless of the actual number of addresses the terminal device 200 holds. In this case, it is likely to happen that the information processing apparatus 100 cannot distinguish between (1) the user provides permission but the number of addresses held by the terminal device 200 is zero and (2) the user provides no permission.

In this regard, since the method according to the present embodiment provides the user with a sufficient time to perform permission operation, it is possible to estimate that the probability of the above-mentioned (1) is higher than that of the above-mentioned (2). Namely, despite continuing the acquisition request for a given amount of time, if the number of addresses is zero, it is possible to predict that the terminal device 200 does not have one or more addresses originally. In a different point of view, since the permission operation is expected to be performed during the given time period mentioned above, if the terminal device 200 has one or more addresses, then the information processing apparatus 100 can properly obtain address book information representing the one or more addresses.

The process flow of the information processing apparatus 100 is described below with reference to FIGS. 4 to 10. A specific process flow according to OS of the terminal device 200 is also described with reference to FIGS. 11 to 14E.

2.1 Process Flow in Information Processing Apparatus

Figure 4:
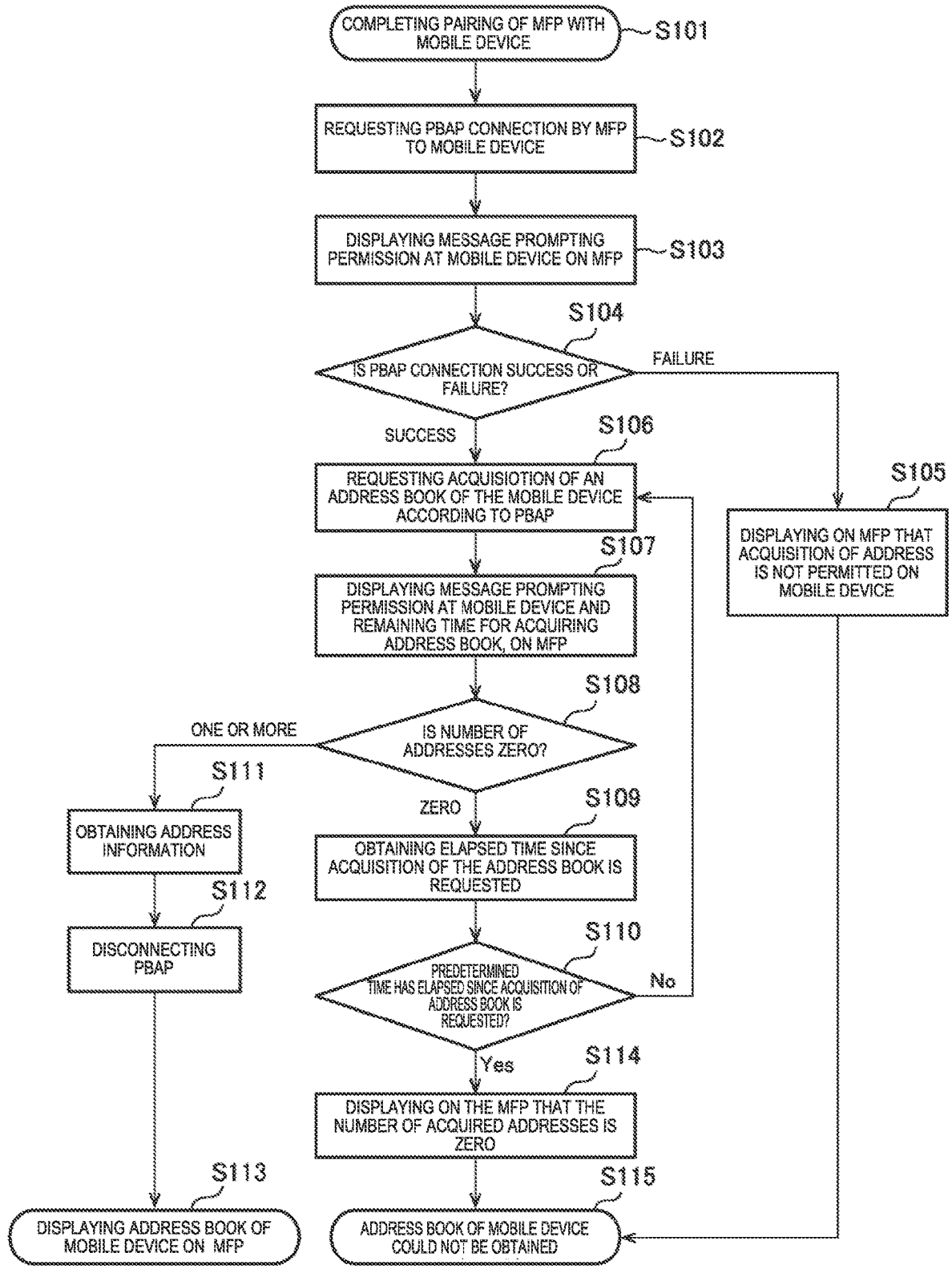
FIG. 4 is a flowchart explaining a process performed by the information processing apparatus.

FIG. 4 is a flowchart describing the process in the information processing apparatus 100. First, in step S101, the pairing of the information processing apparatus 100 and the terminal device 200 are paired. FIG. 4 illustrates an example in which the information processing apparatus 100 is an MFP and the terminal device 200 is a mobile device.

Figure 5:
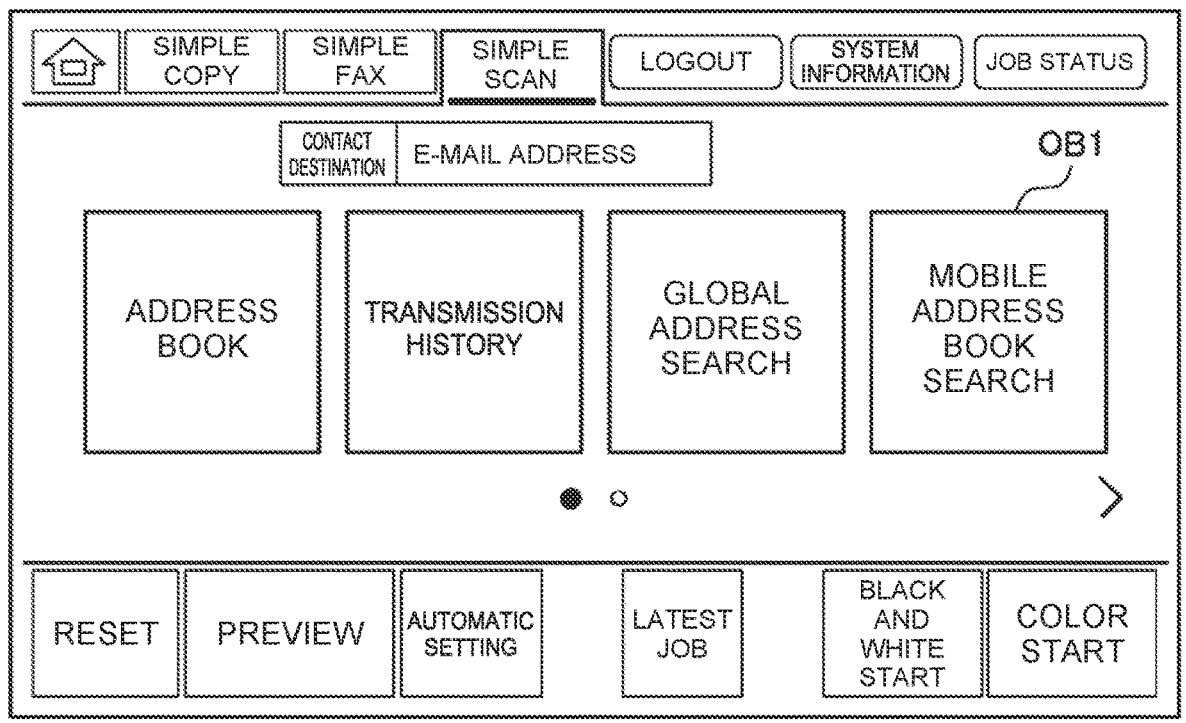
FIG. 5 is an example of the address book selection screen displayed on a display of the information processing apparatus.

FIG. 5 shows an example of a screen displayed on the display 140 of the information processing apparatus 100 for performing pairing illustrated at step S101. FIG. 5 is an example of an address book information selection screen for selecting a destination address of data, and an object OB1 for acquiring the address from the terminal device 200 is displayed on the screen. Triggered by that the user operation to select object OB1 is done, the information processing apparatus 100 initiates the process of acquiring address book information from the terminal device 200.

Specifically, when the selection operation of object OB1 is performed, the controller 110 performs Bluetooth® advertisement using the communicator 120. In association with that, the controller 110 displays information for pairing of Bluetooth® on the display 140.

Figure 6:
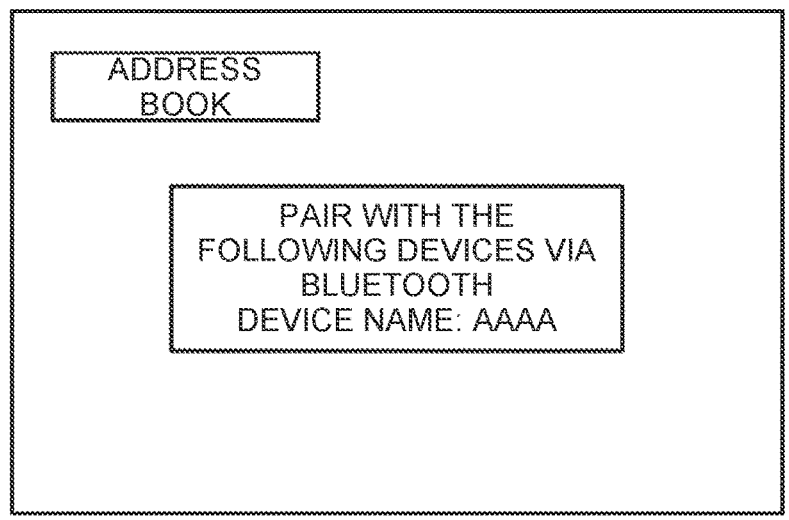
FIG. 6 is an example of a pairing waiting screen displayed on the display of the information processing apparatus.

FIG. 6 shows an example of the pairing waiting screen displayed on the display 140 when the selection operation of the object OB1 is performed. As shown in FIG. 6, the information for pairing displayed on the pairing waiting screen includes a device name of the information processing apparatus 100. A device present in the vicinity of the information processing apparatus 100, which can perform Bluetooth communication, can detect that the information processing apparatus 100 is present in the vicinity thereof by scanning the advertisement mentioned above. For example, when the terminal device 200 is in the vicinity of the information processing apparatus 100 and Bluetooth® is turned on, the terminal device 200 obtains information including the device name of the information processing apparatus 100 as a scan result. In the example in FIG. 6, the device name is "AAAA." The user operates to select the information processing apparatus 100 on the terminal device 200, so that pairing of the information processing apparatus 100 and the terminal device 200 is performed.

Next, in step S102, a connection request for PBAP, which is a profile for acquiring address book information, is transmitted from the information processing apparatus 100 to the terminal device 200. Specifically, the controller 110 performs control to instruct the communicator 120 to transmit the connection request to the terminal device 200.

Furthermore, in step S103, the controller 110 performs control to display on the display 140 information which prompts the user to execute permission operation on the terminal device 200. The permission operation is a user operation to permit to share address book information with the information processing apparatus 100.

Figure 7A:
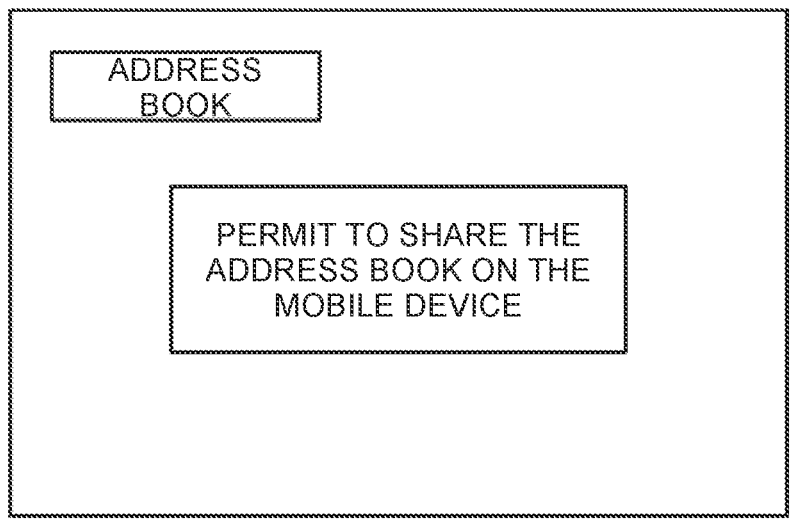
FIG. 7A is an example of a permission waiting screen displayed on the display of the information processing apparatus.

FIG. 7A shows an example of a screen displayed on the display 140 by the control in step S103. The screen prompting the user permission may include text such as "Please permit to share the address book on your mobile device", etc. However, the screen displayed in step S103 is not limited to FIG. 7A, but may be a screen displaying an image or an icon which prompts the user permission or other form of screen.

Next, in step S104, the controller 110 determines whether PBAP connection succeeds or fails. As mentioned above, the behavior in PBAP connection differs according to the OS of the terminal device 200. For example, the terminal device 200 operating according to the first OS replies to a request for connection in the step S102 in association with information whether the user permission is provided or not. For example, if the user permission is provided, the terminal device 200 operating according to the first OS responds to allow the request for PBAP connection, and if the user permission is not provided, it responds to reject the request for PBAP connection. For example, the terminal device 200 operating according to the second OS responds to the request for connection in the step S102 to allow the request for PBAP connection regardless of whether the user permission is provided or not. In the above mentioned example, regardless of the type of OS of the terminal device 200, if a connection request for a profile is rejected, it is possible to determine that the user permission has not been provided.

Therefore, if the connection based on the connection request is failed ("Failure" in step S104), in step S105, control is performed to display information on the display 140 indicating that sharing of address book information is not permitted. As shown in step S102, the connection request here is a connection request of communication according to profile for sharing the address book information (e.g. PBAP), which the controller 110 transmits to the terminal device 200 via communicator 120.

Figure 8:
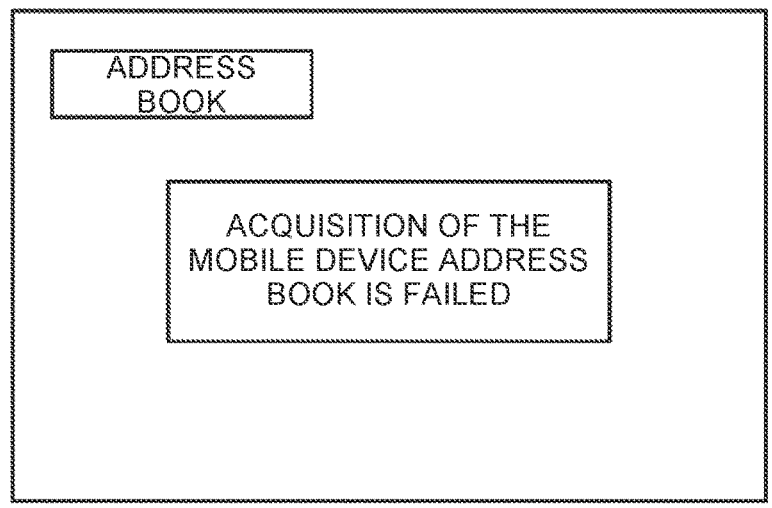
FIG. 8 is an example of an acquisition failure screen displayed on the display of the information processing apparatus.

FIG. 8 is an example of the screen displayed on the display 140 in step 105. The screen here may include text such as "Failed to obtain mobile device address book", etc., for example. Alternatively, information, which clarifies that a cause of the failure to obtain the information is in that the user permission is not provided, may be displayed such as "Address book sharing is not permitted on the mobile device", etc. Other various modifications can be carried out in the specific information displayed in step S105.

On the other hand, if connection with the terminal device 200 succeeds based on the connection request for communication according to the profile ("success" in step S104), in step S106, the controller 110 performs control to transmit an acquisition request of the address book information. As mentioned above, the acquisition request in step S106 is a request to be transmitted according to a predetermined profile (PBAP).

Next, in step S107, similar to step S103, the controller 110 performs control to display on the display 140 information which prompts the user to execute permission operation of sharing the address book information on the terminal device 200.

However, in step S107, the controller 110 may perform control to display information indicating a relationship between a lapse time since the start of transmission of the acquisition request and the given time period. The start of transmission of the acquisition request stands for a timing when an acquisition request is transmitted for the first time (step 106 is performed for the first time) in one acquisition process of address book information (the process shown in FIG. 4). However, in this method according to the present embodiment, the successful connection of the profile becomes a trigger for transmitting the first acquisition request (steps S104, S106 in FIG. 4), and it is assumed that a time difference between the determination of a successful connection and the transmission of the first acquisition request is not extremely large. Therefore, the timing when "success" is determined in step S104 may be used as the "start of transmission of an acquisition request" in the present embodiment. The "start of transmission of the acquisition request" in the present embodiment may be the timing when "success" is determined in step S104 or any other timing which can be specified based on the timing when step S106 is performed for the first time, and variations modifications can be carried out in specific timing.

Figure 7B:
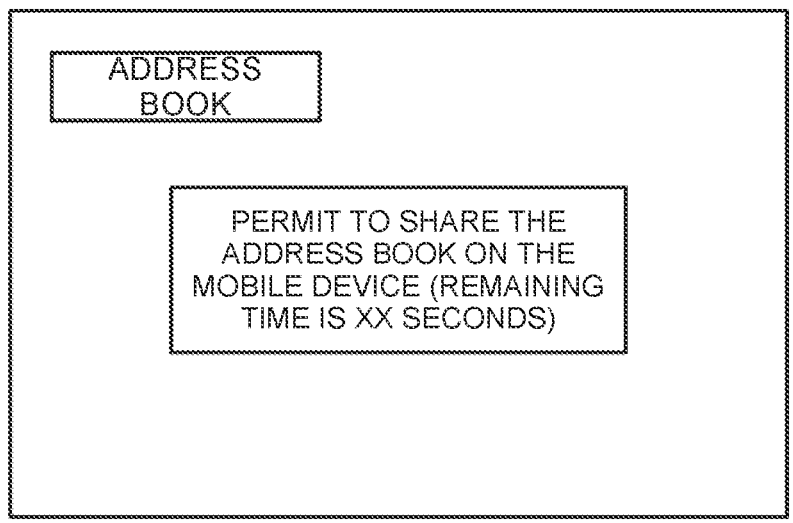
FIG. 7B is an example of a permission waiting screen displayed on the display of the information processing apparatus.

FIG. 7B shows an example of the screen displayed on the display 140 in step S107. The screen prompting the user permission may include information representing the remaining time as well as text such as "Please permit to share the address book on your mobile device", etc. Here, the remaining time is the value obtained by subtracting a lapse time since transmission of the acquisition request is initiated from the given time period, and is numerical data expressed in a minute or second unit, for example. For example, if the given time period is 60 seconds and the lapse time since transmission of the acquisition request is initiated is 20 seconds, the remaining time comes to 40 seconds. Namely, the remaining time represents a remaining time to continue transmitting the acquisition request for the address book information, in other words, a remaining time to wait for the user to permit to share the address book. In this way, since a sufficient time period to possibly perform permission operation is presented, it is possible to encourage the user to promptly perform the permission operation. The information displayed in step S107 is not limited to the remaining time, as long as the information represents the relationship between a lapse time and a given time period. For example, the controller 110 may display a screen which shows in parallel both a current time and a time when a given amount of time has elapsed, and various modification can be carried out in a specific form.

In step S108, the controller 110 obtains from the terminal device 200 a reply in response to the acquisition request in step S106, and determines whether the number of addresses is zero or not based on the reply. If the number of addresses is determined to be zero, the controller 110 moves the process to step S109.

As a case where the number of addresses is zero, it is considered that although the terminal device 200 is permitted to share address book information, the terminal device 200 holds no effective addresses (the first OS and the second OS), or that the terminal device 200 is not permitted to share the address book information (the second OS). However, as described above, since it is not easy to distinguish between these cases in the information processing apparatus 100, the controller 110 performs control to be able to appropriately respond even in either case.

Specifically, in step S109, the controller 110 obtains a lapse time since the acquisition request for the address book information is initiated. For example, the controller 110 may start counting up the counter at the timing when a process at step S106 is performed for the first time, and perform a process to obtain the count value at that time in step S109. The information processing apparatus 100 may have an internal counter or obtain information such as count values and the like from other devices via the communicator 120.

In step S110, the controller 110 determines whether a given time period has elapsed since the acquisition request for the address book information is initiated. Here, the given time period represents the maximum time to continue transmitting the acquisition request, and any length of time can be set.

If a lapse time does not reach the given time period, the controller 110 returns to step S106 to continue the process. Namely, the controller 110 retransmits the acquisition request for the address book information, displays a screen to prompt permission corresponding to FIG. 7B, and determines a response to the retransmitted acquisition request. In this case, since the lapse time increases as the loop process is repeated, the information displayed in step S107 (e.g., remaining time) changes accordingly. If the response to the retransmitted acquisition request also indicates that the number of addresses is zero, the controller 110 performs steps S109 to S110, and if the given time period is not elapsed, the process returns to step S106 again.

As shown in step S107, during a time period until a given time period elapses after transmission of the acquisition request is initiated, the controller 110 may perform control to display information on the display 140 to prompt the user to perform an operation to permit to share the address book information on the terminal device 200. As displaying information shown in FIG. 7B is continued, this makes it possible to appropriately prompting the user to perform the permission operation.

Thus, when the address book information cannot be obtained in response to the acquisition request ("zero" in step S108) and a given time period does not elapse since transmission of the acquisition request is initiated ("No" in step S110), the controller 110 performs control to retransmit the acquisition request (step S106). As a result, it is possible to provide the user with a given time period as a sufficient time before the user permits to share the address book information.

As can be seen from the above mentioned description, the "when the address book information cannot be obtained" in the present embodiment may include the case where a reply is obtained, which describes that no address is obtained in response to the acquisition request. In this way, even if the OS is OS which replies that no address is obtained when the user does not provide permission, like the second OS, it is possible for the user to be prompted to provide permission without immediately adopting such a zero address result. In other words, it is possible to suppress confusion between the case where the user does not provide permission and the case where the user provides permission and no address is held in the terminal device 200.

In the method according to the present embodiment, the user operating the information processing apparatus 100 intends to obtain the address book information from the terminal device 200, and it is assumed that the terminal device 200 is a device to be managed by the same user or person involved. The reason why is that if the terminal device 200 is unrelated to the user, it is unknown what kind of address book information the terminal device 200 holds, and it is unlikely that the address book information of such a terminal device 200 would be shared. Namely, when the user operates object OB1 on the screen shown in FIG. 5, it is highly probable that the user intends to perform the permission operation on the terminal device 200. In other words, in the method according to the present embodiment, even in the case where the profile connection succeeds without user's permission and an acquisition request for the address book information is transmitted, like the second OS, for example, it is highly probable that the user performs the permission operation during a loop process of steps S106 to S110.

After the permission operation is performed, the terminal device 200 can appropriately reply the number of addresses it holds, regardless of whether OS of the terminal device 200 is the first OS or the second OS. For example, when the terminal device 200 holds one or more addresses, since the controller 110 receives a reply including the number of addresses in step S108, it can determine that the terminal device 200 holds "one or more addresses".

In this case, in step S111, the controller 110 obtains the address book information via the communicator 120. In step S112, the controller 110 disconnects the connection according to PBAP by the communicator 120.

If the address book information is obtained from the terminal device 200 via the communicator 120 in response to the acquisition request for the address book information, the display 140 may display the address book information in step S113. Specifically, the controller 110 perform control to display the obtained address book information on the display 140.

Figure 9:
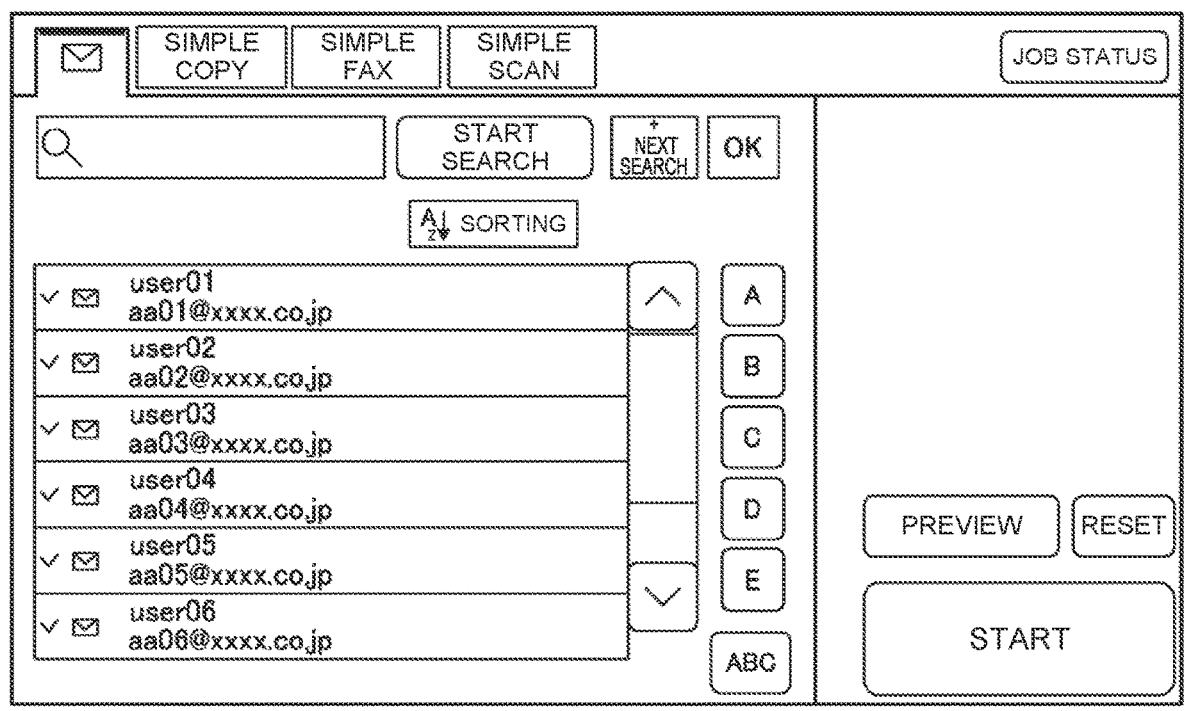
FIG. 9 is an example of an address book display screen displayed on the display of the information processing apparatus.

FIG. 9 is an example of a screen displayed in step S113. As shown in FIG. 9, the controller 110 may display a list of one or more addresses included in the acquired address book information. In the example in FIG. 9, the address book information includes information correlating the user names and E-mail addresses, and the controller 110 performs control to display the list of user names and E-mail addresses.

In this way, the address book information obtained from the terminal device 200 can be properly presented to the user. For example, all of the obtained address book information may be stored in the storage 150 of the information processing apparatus 100. Alternatively, by the user selecting one or more addresses on the screen shown in FIG. 9, the selected addresses may be stored in the storage 150.

The address book information obtained in the present embodiment may be used to decide a destination address of data to be transmitted. Here, the data to be transmitted may be data related to images obtained in scanning function or facsimile function, for example. For example, information processing apparatus 100 further includes an image reader to read a document and obtain an image which is the reading result. The image reader includes, for example, a transport section to transport the document to be read, a light source to irradiate light on the document on a transport path, and a light receiving section to receive light reflected by the document. The transport section includes transport rollers, for example. The light source is a light emission element such as an LED (light emitting diode), etc., for example. The light-receiving section is a photoelectric conversion element such as a PD (Photodiode), etc., for example. The image reader is not limited to one which transports the document, but may include a mechanism to drive the light source and the light receiving section. The image reader acquires an image based on the detection result in the light receiving section.

When the controller 110 obtains the address book information including one or more addresses in response to an acquisition request for the address book information, the controller 110 obtains information based on the image, which is the reading result by the image reader, as data to be transmitted, and identifies the destination address of the data to be transmitted based on the address book information. For example, the controller 110 displays an address list including addresses obtained from the terminal device 200 on the display 140 and transmits data representing images to the destination address selected by the user from the address list. In this way, it is possible to easily identify output destination of images in the information processing apparatus 100 (image-forming apparatus, image-processing apparatus).

However, the data to be processed for transmission using the address book information is not limited to images acquired by the scanning function, but can be extended to various types of information accessible by the MFP. For example, the information processing apparatus 100 includes a storage 150, as shown in FIG. 2. When the address book information is obtained, the controller 110 may identify the destination address of the data to be transmitted stored in the storage 150 based on the address book information. For example, the display 140 can display a list of data, etc. stored in the storage 150, and the data to be transmitted may be data selected by the user based on the list, etc.

Alternatively, the information processing apparatus 100 may possibly read data from an external storage device. The external storage device may be flash memory, HDD, SSD (Solid State Drive), or any other storage device. For example, the information processing apparatus 100 includes an interface to connect itself with the external storage device. For example, the external storage device may be a USB (Universal Serial Bus) memory, and the interface may be a USB port. Alternatively, the external storage device may be an SD card or a card-typed storage device similar thereto, and the interface may be an SD card slot and the like. Alternatively, the external storage device may be a storage device connected via the communicator 120. When the address book information is obtained, the controller 110 may identify the destination address of the data to be transmitted which is stored in the external storage device based on the address book information.

If the address book information containing one or more addresses cannot be obtained after a given time period elapses, "Yes" is determined in step 110 in FIG. 4. In this case, in step S114, the controller 110 perform control to display on the display 140 information indicating that no address is obtained from the terminal device 200.

Figure 10:
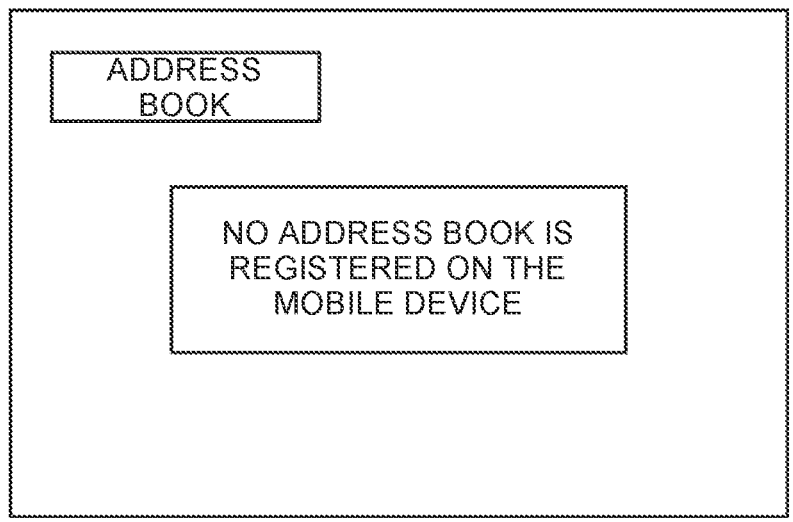
FIG. 10 is an example of a timeout screen displayed on the display of the information processing apparatus.

FIG. 10 shows an example of the screen displayed on the display 140 in step S114. The information indicating that no address is obtained may be text such as "No address book is registered in the mobile device", etc., for example. Specific information is not limited thereto, and other text may be displayed, or an image or icon indicating that no address is registered may be displayed.

If the processing of step S105 or step S114 is performed, the controller 110, in step S115, determines that the address book information of the mobile device could not be obtained. In this case, for example, the controller 110 terminates the process of obtaining address book information. Since the controller 110 notifies the user in step S105 or step S114, it may perform control to return to a home screen, etc. without further notifying the user.

As mentioned above, according to the method in the present embodiment, the information processing apparatus 100 can appropriately perform operations regardless of the type of OS of the terminal device 200. For example, if OS of the terminal device 200 rejects the profile connection when sharing the address book information is not permitted, the process in step S105 allows the user to be appropriately notified. In addition, if the profile connection succeeds, considering the second OS, a loop process in steps S106 to S110 can be executed. Therefore, if one or more addresses are obtained, they can be displayed (step S113), and if no address is obtained after a given time period elapses, it is possible to determine that it is highly probable that the number of addresses held in the terminal device 200 is zero (step S114).

2.2 Specific Examples of Process According to OS of the Terminal Device

Next, a specific flow of operation is described below for the case where the OS of the terminal device 200 is the first OS and the case where the OS of terminal device 200 is the second OS.

Figure 11:
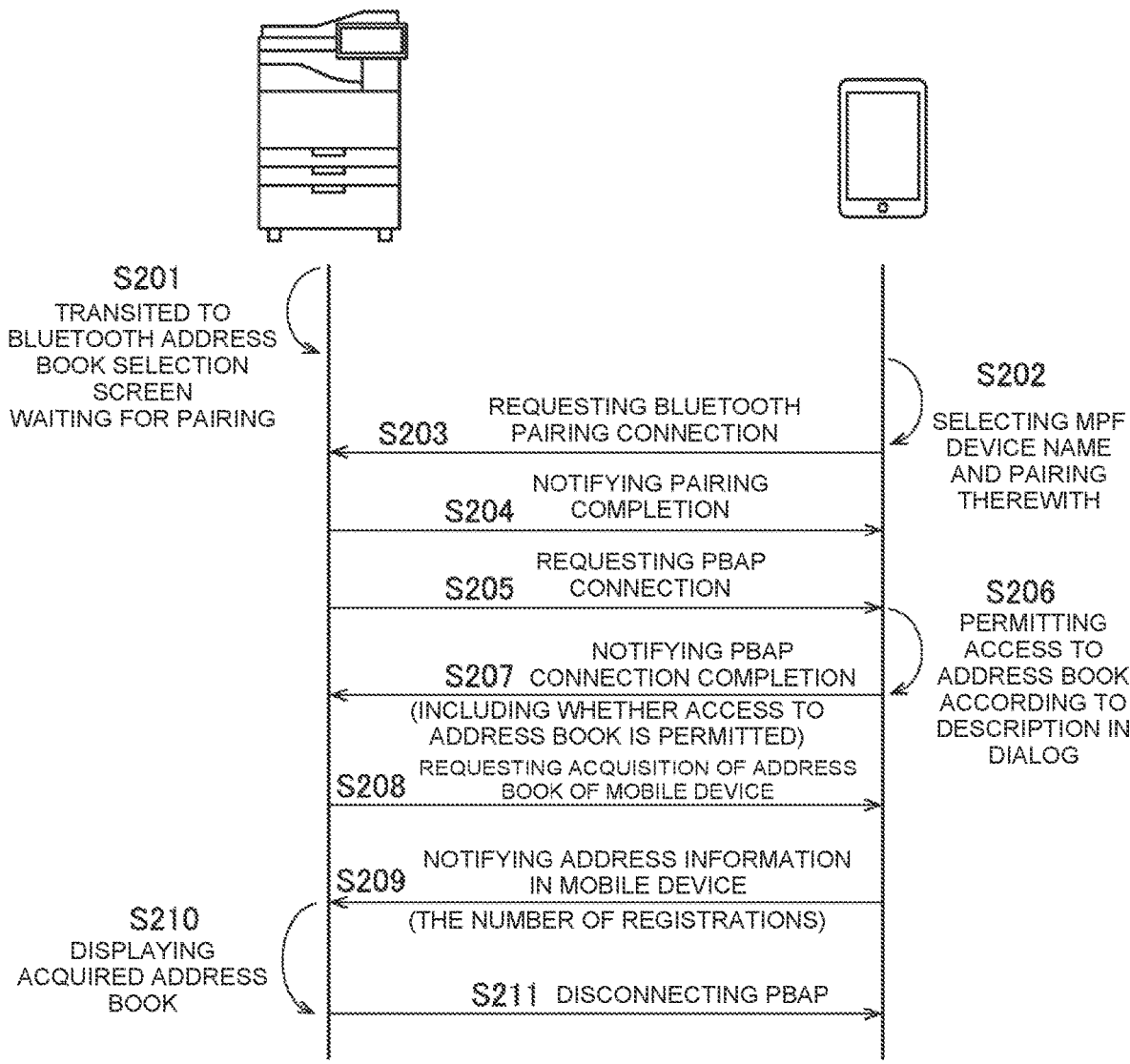
FIG. 11 is an example of a processing sequence when the terminal device's OS is the first OS.

FIG. 11 is a diagram illustrating a process sequence when the OS of terminal device 200 is the first OS. First, in step S201, the information processing apparatus 100 performs transition to a selection screen of the address book information using Bluetooth® and becomes in the waiting state for pairing. Specifically, on the information processing apparatus 100, the selection operation of object OB1 shown in FIG. 5 is performed, Bluetooth® advertisement is initiated, as well as transition to a screen shown in FIG. 6 is performed. By the user performing the pairing operation pairing is completed (step S101 in FIG. 4), and the information processing apparatus 100 initiates a process for sharing the address book information.

Figure 12A:
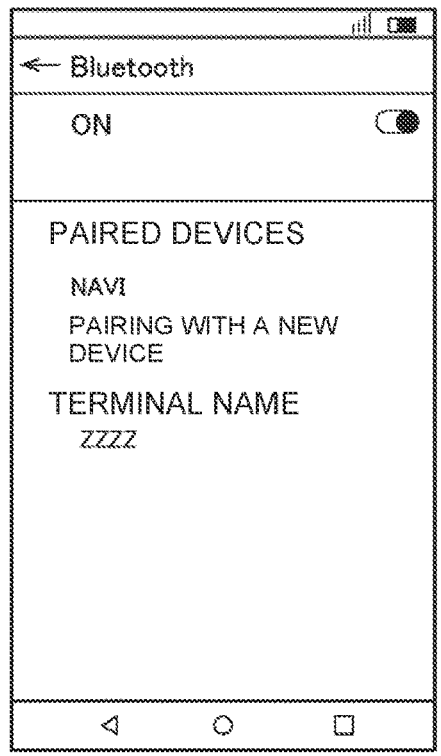
FIG. 12A is an example of a screen displayed on a display of the terminal device.

FIGS. 12A to 12E show examples of screens displayed on the terminal display 240 of the terminal device 200 operating in accordance with the first OS. FIG. 12A shows an example of a screen to perform setting for Bluetooth® on the terminal device 200. Paired device is displayed in the column "Paired Devices." A terminal name stands for a device name of the terminal device 200 in the Bluetooth® connection. If the user performs operation to select "Setting for pairing with a new device" in FIG. 12A, for example, the terminal display 240 transits to a screen shown in FIG. 12B.

Figure 12B:
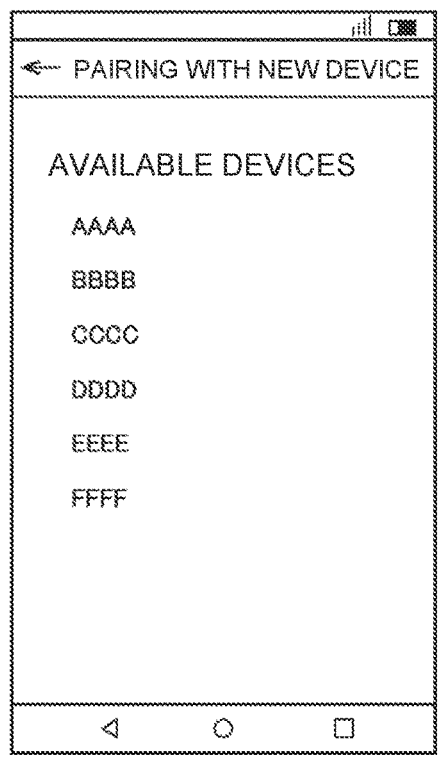
FIG. 12B is an example of a screen displayed on the display of the terminal device.

FIG. 12B is a device selection screen for selecting a device to be paired. For example, the terminal controller 210 displays the results scanned by the terminal communicator 220 as candidates of connection devices. Since the advertisement is performed in step S201, the scanned results include the information processing apparatus 100. Here, an example, in which a device name of the information processing apparatus 100 is "AAAA", is considered. As shown in FIG. 6, since the device name of the information processing apparatus 100 is displayed on the display 140, the user can appropriately select the information processing apparatus 100 from the scanned results by reviewing the device name.

In step S202, the terminal device 200 accepts a user operation to select a device name corresponding to the information processing apparatus 100 and performs pairing. First, the terminal controller 210 performs control to transit to a screen shown in FIG. 12C when "AAAA", which represents the information processing apparatus 100, is selected in FIG. 12B.

Figure 12C:
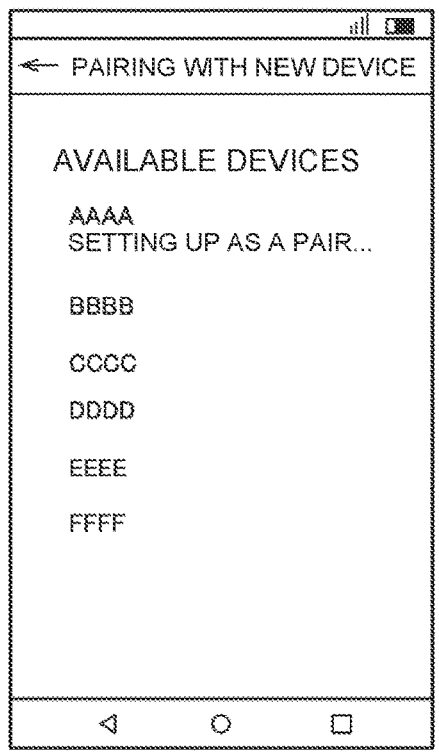
FIG. 12C is an example of a screen displayed on the display of the terminal device.

FIG. 12C is a screen showing that the connection is in progress. While the screen shown in FIG. 12C is displayed, the terminal device 200 transmits a Bluetooth® pairing connection request to the information processing apparatus 100 in step S203. In step S204, the information processing apparatus 100 transmits a pairing completion notification to the terminal device 200. This allows pairing of the information processing apparatus 100 and the terminal device 200 to be completed.

Next, in step S205, the information processing apparatus 100 transmits a connection request for a profile (PBAP connection request) to the terminal device 200. As shown in step S103 in FIG. 4, the information processing apparatus 100 may display a permission waiting screen shown in FIG. 7A.

When the terminal device 200 operating according to the first OS receives a connection request for a profile, it may display a permission dialog regarding whether the user permits to share the address book information or not.

Figure 12D:
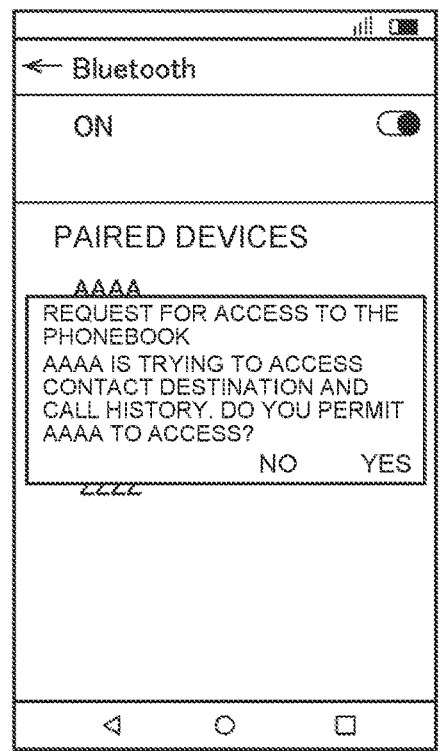
FIG. 12D is an example of a screen displayed on the display of the terminal device.

FIG. 12D is an example of a screen on which the permission dialog is displayed. For example, the permission dialog includes text for asking whether the user permits a device corresponding to the device name "AAAA" to access the address book information or not, and text "Yes" and "No" for user's selection. "Yes" and "No" are objects in which either one is selectable. In step S206, the terminal device 200 accepts user input. In FIG. 11, an example, in which the user selects "Yes" and permits to access to the address book information from the information processing apparatus 100, is considered.

Figure 12E:
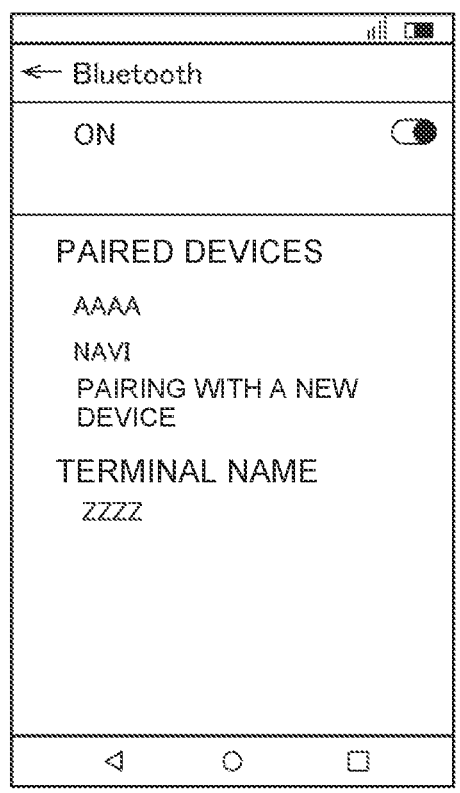
FIG. 12E is an example of a screen displayed on the display of the terminal device.

In step S207, the terminal device 200 transmits permission of access as well as a profile connection completion notification to the information processing apparatus 100. This allows the profile connection to be completed, so that the terminal display 240 displays a screen shown in FIG. 12E. As shown in FIG. 12E, the device name "AAAA", which represents information processing apparatus 100, is displayed in the column "Paired Devices." In addition, since sharing the address book information is permitted in the permission dialog, the information processing apparatus 100 is ready to obtain the address book information.

Here, since the profile connection succeeds while permission is provided, the information processing apparatus 100 performs processes after step S106 in FIG. 4. Specifically, in step S208, the information processing apparatus 100 transmits an acquisition request for the address book information to the terminal device 200. It is permitted for the first OS to share the address book information upon the profile connection succeeds. Therefore, in step S209, the terminal device 200 transmits the addresses it holds to the information processing apparatus 100. If the terminal device 200 holds one or more addresses, valid address book information is transmitted to the information processing apparatus 100.

In step S210, the information processing apparatus 100 performs a process to display the obtained address book information as mentioned above with reference to FIG. 9. In step S211, the information processing apparatus 100 disconnects the profile connection.

If "No" is selected in the permission dialog shown in FIG. 12D, since no profile connection succeeds, the connection is determined as "failure" in step 104 in FIG. 4, and a process in step S105 is performed. Namely, the user can be appropriately informed that the user has not yet provided permission on the side of the terminal device 200. In this case, since the user explicitly performs an operation not to provide the permission, it is considered that the necessity for prompting the user to provide the permission for operation by repeating the acquisition requests is low.

Furthermore, if no address is held in the terminal device 200, since a lapse time exceeds a given time period by repeating determination of "zero" in step S108, the process of step S114 is performed. Namely, the user can be appropriately informed that no addresses is held in terminal device 200.

As mentioned above, when the first OS is used, multiple states (e.g., four) can be considered depending on conditions such as whether the user provides permission or not as well as whether the number of the addresses stored in the terminal device 200 is zero or one or more, etc. According to the method of the present embodiment, as shown in FIGS. 11 to 12E, even in any of the multiple states, the information processing apparatus 100 can perform appropriate control.

Figure 13:
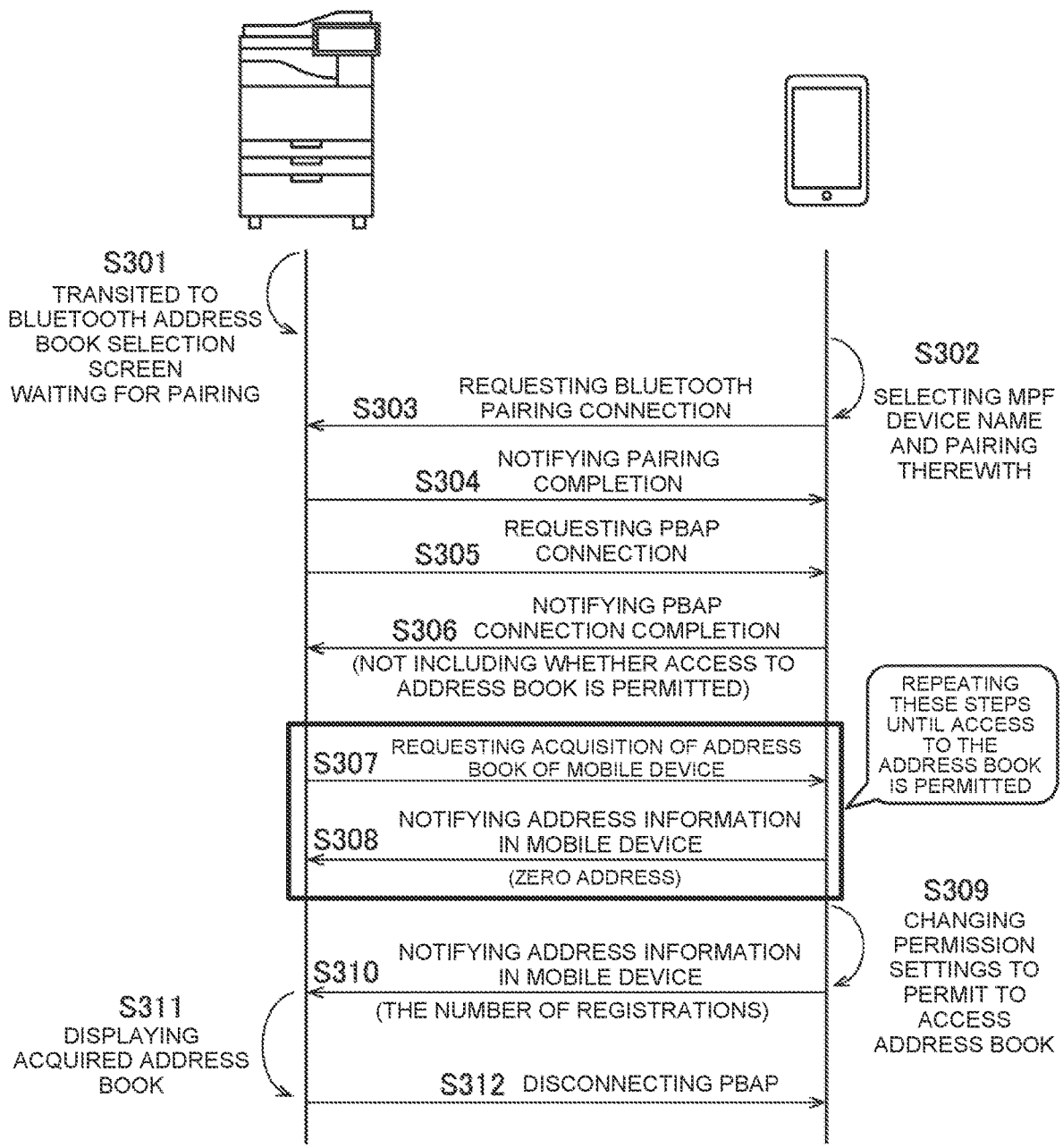
FIG. 13 is an example of a processing sequence when the terminal device's OS is the second OS.

FIG. 13 is a diagram illustrating a process sequence when the OS of terminal device 200 is the second OS. First, in step S301, the information processing apparatus 100 performs transition to a selection screen of the address book information using Bluetooth® and becomes in the waiting state for pairing.

Figure 14A:
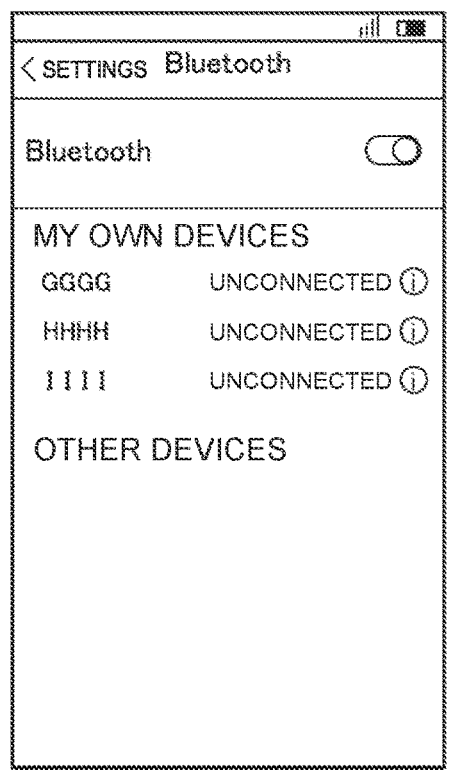
FIG. 14A is an example of a screen displayed on the display of the terminal device.

FIGS. 14A to 14E show examples of screens displayed on the terminal display 240 of the terminal device 200 operating in accordance with the second OS. FIG. 14A shows an example of a screen to perform setting for Bluetooth® on the terminal device 200. In FIG. 14A, devices with pairing history are listed in the column "My devices".

Figure 14B:
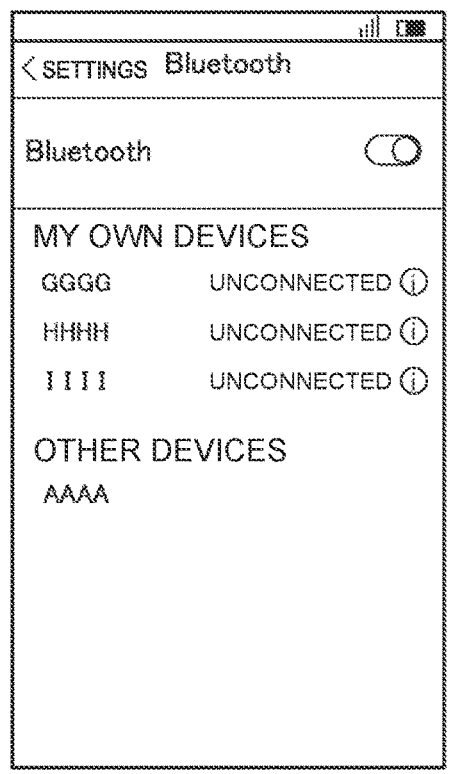
FIG. 14B is an example of a screen displayed on the display of the terminal device.

Furthermore, if no pairing is performed and a device being advertised is in the vicinity thereof, the terminal device 200 displays information on the device in the column "Other Devices", as shown in FIG. 14B.

FIG. 14B is a device selection screen for selecting a device to be paired. For example, the terminal controller 210 displays in the column "Other devices" the results scanned by the terminal communicator 220 as candidates of connection devices. Since the advertisement is performed in step S301, the scanned results include the information processing apparatus 100. Here, an example, in which a device name of the information processing apparatus 100 is "AAAA", is considered. As shown in FIG. 6, since the device name of the information processing apparatus 100 is displayed on the display 140, the user can appropriately select the information processing apparatus 100 from the scanned results.

If information processing apparatus 100 is selected in FIG. 14B (step S302), the terminal device 200 transmits a connection request for pairing to the information processing apparatus 100 in step S303. In step S304, the information processing apparatus 100 transmits a pairing completion notification to the terminal device 200. After the pairing completion, in step S305, the information processing apparatus 100 transmits a connection request for a profile to the terminal device 200. In step S306, the terminal device 200 transmits a profile connection completion notification to the information processing apparatus 100.

Figure 14C:
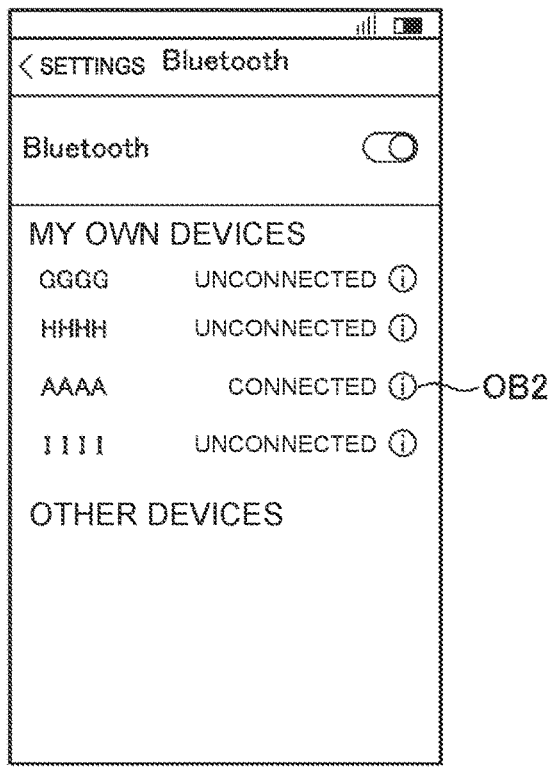
FIG. 14C is an example of a screen displayed on the display of the terminal device.

FIG. 14C shows a screen displayed on the terminal display 240 after the user operation to select the information processing apparatus 100 is performed in step S302. It appears that the device name "AAAA" representing the information processing apparatus 100 moves to the column "My device", indicating pairing is completed. If the process is completed until step S306, not only pairing but also profile connection are completed.

As shown in FIGS. 13 and FIGS. 14A to 14C, in the second OS the user does not need to provide permission/not permission, and a profile connection completion notification is notified. In other words, the profile connection completion notification is not accompanied by information about the user's permission for the address book information, and the profile connection succeeds regardless of whether the user provides permission or not.

Since the profile connection succeeds, the information processing apparatus 100 performs processes after step S106 in FIG. 4. Specifically, in step S307, the information processing apparatus 100 transmits an acquisition request for the address book information to the terminal device 200. In step S308, the terminal device 200 transmits information about the address it holds to the information processing apparatus 100. However, at the stage corresponding to FIGS. 14A to 14C, the user does not provide permission and the information processing apparatus 100 cannot access the address book information of the terminal device 200. As a result, in step S308, the terminal device 200 notifies the user that the number of addresses is zero. Therefore, as described above with reference to FIG. 4, a process of step S307 and a process of step S308 are repeated until the given time period elapses.

During this time period, the display 140 of the information processing apparatus 100 continues to show the permission waiting screen shown in FIG. 7B, for example. By reviewing the permission waiting screen, the user can recognize that he/she needs to perform permission operation on the terminal device 200. Thus, in step S309, the terminal device 200 accepts the permission operation by the user.

Specifically, the user performs an operation to select object OB2 for detailed settings of the device on the screen shown in FIG. 14C. For example, object OB2 is displayed correlated with the device name "AAAA" representing the information processing apparatus 100. When the selection operation of object OB2 is performed, the terminal display 240 displays a screen shown in FIG. 14D.

Figure 14D:
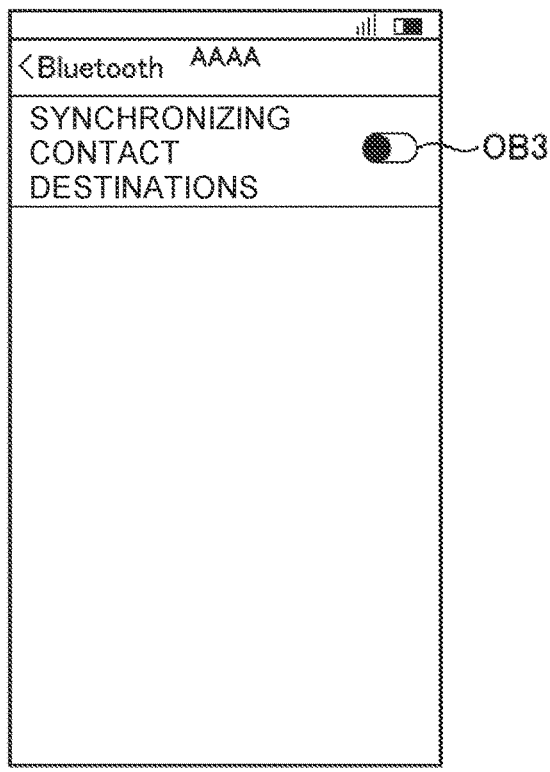
FIG. 14D is an example of a screen displayed on the display of the terminal device.

FIG. 14D is a screen for detailed settings of a given device. Here, since PBAP is selected as the profile, the screen for detailed settings is a screen which allows the user to select whether to permit to access the address book information or not, as shown in FIG. 14D. In the example in FIG. 14D, access to address book information is permitted by turning on the item "Synchronize contact destinations." For example, the user can select whether to permit to share the address book information or not by selecting or sliding the object OB3 in FIG. 14D.

Figure 14E:
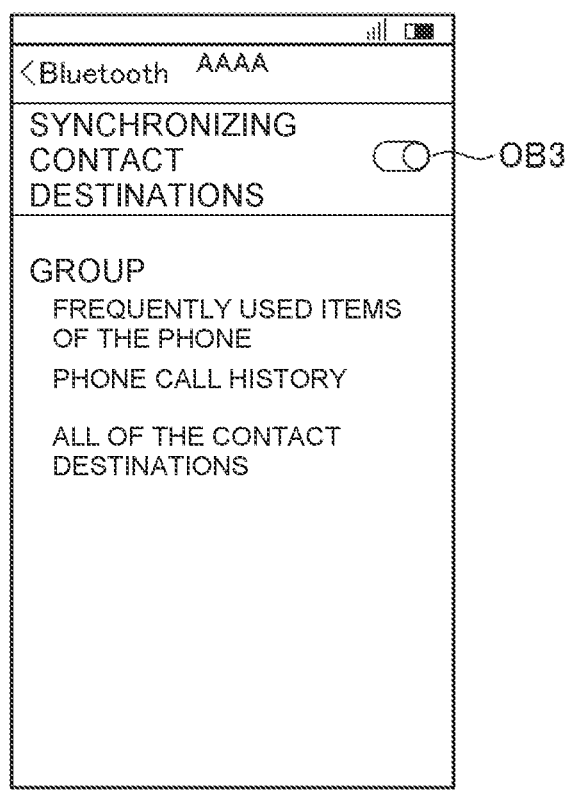
FIG. 14E is an example of a screen displayed on the display of the terminal device.

FIG. 14E is an example of a screen displayed on the terminal display 240 when the address book information is permitted to share. In FIG. 14E, specific categories of information to be shared and the like may be displayed. With the screen shown in FIG. 14E being displayed, the information processing apparatus 100 is ready to obtain the address book information.

As a result, in step S310, the terminal device 200 transmits valid address book information to the information processing apparatus 100 in response to the acquisition request for the address book information. In step S311, the information processing apparatus 100 performs a process to display the obtained address book information as mentioned above with reference to FIG. 9. In step S312, the information processing apparatus 100 disconnects the profile connection.

If the user does not provide permission even after a given time period elapses since the acquisition request for the address book information is transmitted, the process in step S114 in FIG. 4 is performed. As described above, however, in the present embodiment, since the user actively performs operation to share the address book information (see FIG. 5), there is a high probability that the user provides permission. Namely, by providing a given time period as a sufficient time and further by displaying the permission waiting screen shown in FIG. 7B, it is presumed that the user performs the permission operation before a given time period elapses, as shown in FIGS. 14C to 14E. Namely, the present embodiment allows the case where the user does not provide permission while initiating a process to share the address book information to be suppressed.

Even if sharing the address book information is permitted, when no address is held in the terminal device 200, since a lapse time exceeds a given time period by repeating "zero" determination in step S108, the process in step S114 is performed. Namely, the user can be appropriately informed that no addresses is held in terminal device 200.

As mentioned above, when the second OS is used, multiple states can be considered depending on conditions such as whether the user provides permission or not and further whether the number of the addresses stored in the terminal device 200 is zero or one or more, etc. According to the method of the present embodiment, as shown in FIGS. 13 to 14E, even in any of the multiple states, the information processing apparatus 100 can perform appropriate control.

Namely, by making it possible to retransmit an acquisition request for the address book information based on a lapse time and a given time period, appropriate communication control for transmitting and receiving the address book information can be realized regardless of the type of OS of the terminal device 200, whether the user provides permission or not, the number of addresses stored in the terminal device 200, etc. More specifically, even when OS not responding to whether the user provides permission to share the address book information or not is targeted, the user can be appropriately prompted to provide permission, this makes it possible to appropriately share the addresses stored in the terminal device 200 with the information processing apparatus 100.

3. Modification Example

In the above, an example, in which the user's operation in the information processing apparatus 100 to refer to the mobile address book triggers a process of sharing the address book information, is described as illustrated by object OB1 in FIG. 5.

However, the method according to the present embodiment is not limited thereto, and operation triggering a process may be performed on the side of the terminal device 200. For example, information processing apparatus 100 and the terminal device 200 are connected using a communication method such as WiFi®. For example, the information processing apparatus 100 and the terminal device 200 may be each connected to the same wireless LAN access point, or one of the information processing apparatus 100 and the terminal device 200 may function as an access point and the other may connect to the access point.

In this case, the terminal device 200 accepts user operation to share the address book information in the terminal device 200 with other devices, and transmits information about the same to the information processing apparatus 100. The information processing apparatus 100 having obtained the information initiates Bluetooth® advertisement. In this way, the address book information can be shared through the same process as described above, even when triggered by the user's operation on the side of the terminal device 200.

For example, the terminal storage 250 of the terminal device 200 may store a dedicated application software for using the information processing apparatus 100. The terminal controller 210 may perform in accordance with such dedicated application software to accept user operation to share the address book information and transmit information about the same. Alternatively, the information processing apparatus 100 can operate as a Web application server, and the terminal device 200 may communicate with the information processing apparatus 100 using Web browser or the like. Namely, it is not essential for the terminal device 200 in this embodiment to use dedicated application software, and various modification of the method to realize acceptance of user operation which serves as a trigger and transmission of the trigger to the information processing apparatus 100 can be carried out.

The trigger for the process to share the address book information is not limited to user operation. For example, the process to share the address book information may be automatically initiated based on the process in at least one of the information processing apparatus 100 and the terminal device 200. Also in this case, since the sharing of the address book information requires permission by the user, it is possible to suppress the address book information from being shared by the user unintentionally.

Also, in the above, an example in which the information processing apparatus 100 performs Bluetooth® advertisement and the terminal device 200 performs scanning, has been described. However, it is not excluded that the terminal device 200 performs the advertisement. For example, when the user operation which serves as a trigger of process is performed on the side of the terminal device 200 as described above, the terminal device 200 performs advertisement while the information processing apparatus 100 performs a scan, so that pairing may be realized.

The method according to the present embodiment can be applied to a communication system which includes the information processing apparatus 100 and the terminal device 200 described above. The information processing apparatus 100 transmits an acquisition request for the address book information to the terminal device 200, in response to the acquisition request if the information processing apparatus 100 fails to obtain the address book information and a given time period does not elapse since transmission of the acquisition request is initiated, the information processing apparatus 100 performs control to retransmit the acquisition request. The terminal device 200 operates according to one of a plurality of OSs including a first OS and a second OS. The terminal device 200 operating according to the second OS can establish a connection to receive the above mentioned acquisition request even when the user does not provide permission to share the address book information. In this case, the terminal device 200 operating according to the second OS replies the address book information in response to the acquisition request in the case where the user provides permission to share the address book information and it holds valid addresses, and does not reply the address book information in the case where it holds no valid address. Furthermore, the terminal device 200 operating according to the second OS does not reply the address book information in response to the acquisition request in the case where the user does not provide permission to share the same.

According to the method of the present embodiment, even if the behavior in sharing the address book information differs depending on the type of OS of the terminal device 200, it is possible to realize a communication system capable of sharing the address book information appropriately.

The method of the present embodiment can be applied to the information processing method in the information processing apparatus 100 which obtains the address book information from the terminal device 200. The information processing method includes: transmitting an acquisition request for the address book information to the terminal device 200; and retransmitting the acquisition request if the address book information cannot be obtained in response to the acquisition request and a given time period does not elapse since transmission of the acquisition request is initiated.

In addition, whole or part of processes, which the information processing apparatus 100 (controller 110 in the narrow sense) and the terminal device 200 (terminal controller 210 in the narrow sense) perform, may be realized by a program. The program according to the present embodiment can be stored in a non-transitory information storage device (information storage medium), which is a medium which can be read by a computer, for example. The Information storage devices can be realized by optical disk, memory card, HDD, or semiconductor memory and the like, for example. The semiconductor memory is a ROM, for example. At least one of the controller 110 and the terminal controller 210 performs various processes of this embodiment based on programs stored in the information storage device. Namely, the information storage device stores programs to cause the computer to function as a part of the controller 110 and the terminal controller 210. The computer is an apparatus including input device, processor, storage, and output. Specifically, the program according to the present embodiment causes the computer to execute each of steps described above with reference to FIGS. 4, 11, and 13, etc.

Although the present embodiment has been described above in detail, those skilled in the art will easily understand that many modifications can be made within a range not substantially departing from the novelties and effects of the present embodiment. Therefore, all such modifications shall be included within the scope of the present disclosure. For example, a term that is mentioned at least once in the specification or the drawings along with a different term that has broader or synonymous meaning can be replaced by the different term anywhere in the specification or the drawings.

All combinations of the present embodiment and modifications are also included in the scope of the present disclosure. The configuration and operation, etc. of the information processing apparatus and the terminal device are also not limited to those described in the present embodiment, and various modifications can be carried out.

What is claimed is:

1. An information processing apparatus comprising:
a communication interface to communicate with a terminal device;
one or more controllers to control the communication interface; and
a display,
wherein the one or more controllers transmit an acquisition request for address book information to the terminal device via the communication interface,
the one or more controllers control the communication interface to retransmit the acquisition request when the address book information is not obtainable in response to the acquisition request and a given time period does not elapse since the transmission of the acquisition request is initiated,
the one or more controllers display, on the display, information prompting a user to perform, on the terminal device, an operation that permits to share the address book information during a period of time after the transmission of the acquisition request is initiated and until the given time period elapses, and
the one or more controllers display, on the display, information indicating that a number of addresses held in the terminal device is zero when the address book information containing one or more addresses is not obtainable even after the given time period elapses.

2. The information processing apparatus according to claim 1, wherein the address book information not being obtainable includes a case where a reply indicating that the number of addresses is zero is obtained in response to the acquisition request.

3. The information processing apparatus according to claim 1, wherein the one or more controllers display, on the display, the address book information when the address book information is obtained in response to the acquisition request.

4. The information processing apparatus according to claim 3, wherein the one or more controllers further display, on the display, information indicating a relationship between a lapse time since the transmission of the acquisition request is initiated and the given time period.

5. The information processing apparatus according to claim 3, wherein
the one or more controllers control the communication interface to transmit, to the terminal device, a connection request for communication according to a profile to share the address book information,
the one or more controllers control the communication interface to transmit the acquisition request for the address book information when connection with the terminal device based on the connection request succeeds, and
the one or more controllers further display, on the display, information indicating that sharing the address book information is not permitted in the terminal device when the connection based on the connection request fails.

6. The information processing apparatus according to claim 1, wherein
the one or more controllers are capable of acquiring data to be transmitted from at least one of an image reader that reads a document and acquires an image that is the result of reading, a storage included in the information processing apparatus, and an external storage device, and
the one or more controllers identify a destination address of the data to be transmitted based on the address book information when the address book information is obtained in response to the acquisition request.

7. An information processing method in an information processing apparatus obtaining address book information from a terminal device, the method comprising:
transmitting an acquisition request for the address book information to the terminal device;
retransmitting the acquisition request when the address book information is not obtainable in response to the acquisition request and a given time period does not elapse since the transmission of the acquisition request is initiated;
displaying, on a display, information prompting a user to perform, on the terminal device, an operation that permits to share the address book information during a period of time after the transmission of the acquisition request is initiated and until the given time period elapses; and
displaying, on the display, information indicating that a number of addresses held in the terminal device is zero when the address book information containing one or more addresses is not obtainable even after the given time period elapses.

* * * * *